WALLACE & McCLAIN.
Rotary Cultivator.
No. 63,767.
Patented Apr. 9, 1867.
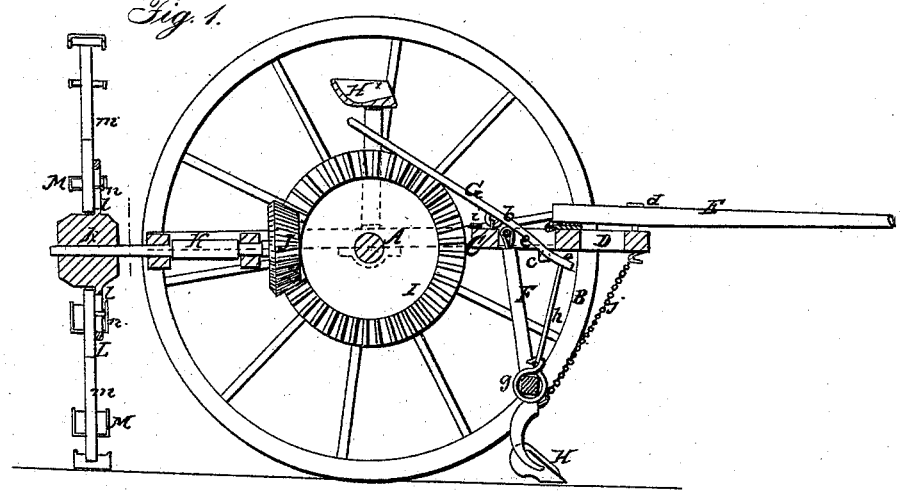
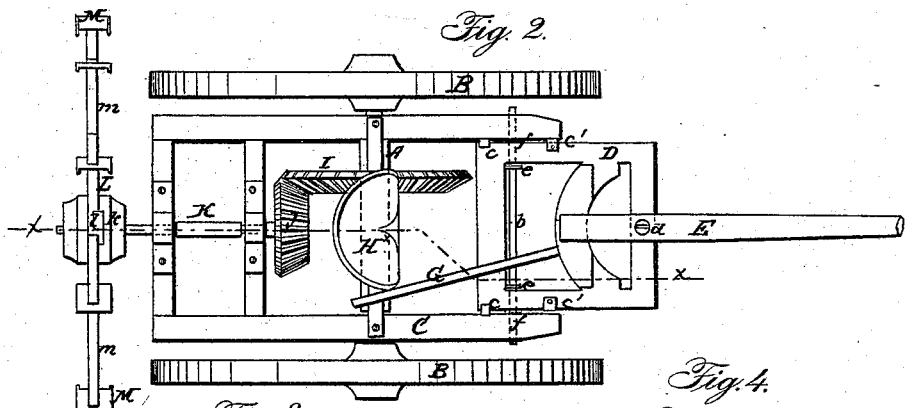
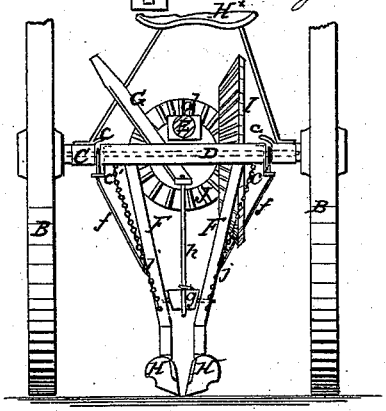
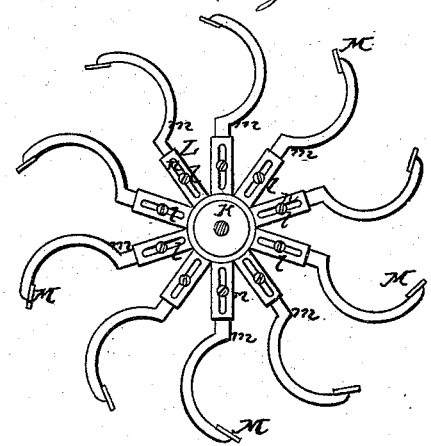
Witnesses:
Inventor:

United States Patent Office.

JOHN ROBERT WALLACE AND BENJAMIN A. McCLAIN, OF MURFREESBORO, TENNESSEE.

Letters Patent No. 63,767, dated April 9, 1867.

IMPROVEMENT IN COTTON CULTIVATORS.

The Schedule referred to in these Letters Patent and making part of the same.

TO ALL WHOM IT MAY CONCERN:

Be it known that we, JOHN ROBERT WALLACE, and BENJAMIN A. McCLAIN, of Murfreesboro, in the county of Rutherford, and State of Tennessee, have invented a new and improved Cotton Cultivator; and we do hereby declare that the following is a full, clear, and exact description thereof, which will enable those skilled in the art to make and use the same, reference being had to the accompanying drawings, forming part of this specification.

This invention relates to a new and improved device for cultivating cotton, and it consists in the employment or use of two shares arranged to operate one at each side of a row of plants and scrape the earth therefrom, and using in connection therewith a rotary chopping wheel, constructed and arranged in such a manner as to cut or thin out the plants as the machine is drawn along, the scraping and cutting or thinning-out operations being performed simultaneously. In the accompanying sheet of drawings—

Figure 1 is a side sectional view of my invention taken in the line $x\,x$, fig. 2.

Figure 2, a plan or top view of the same.

Figure 3, a front view of the same, the cutting wheel being omitted.

Figure 4, a detached side view of the cutting wheel.

Similar letters of reference indicate corresponding parts.

A represents an axle, having a wheel, B, on each end of it and secured permanently thereto, and C is an oblong rectangular frame which is fitted on the axle A, the latter being allowed to turn in its bearings in the frame. In the front part of the frame C there is fitted a smaller frame, D, the latter being secured in the former by a rod, $b$, on which D is allowed to work or move to a certain extent, the distance of said movement being determined by metal lips, $c\,c'$, the former, $c$, being attached to the side pieces of the frame C, and so bent or formed as to lap over the rear parts of the side pieces of D, and the latter, $c'$, attached to the side pieces of D, and so bent or formed as to extend underneath the side pieces of C. This smaller frame D has a draught-pole, E, attached to it by a bolt, $d$, and on the rod $b$ there are fitted two pendent bars F F, the latter having eyes $e$ at their upper ends through which the rod $b$ passes. The bars F F are braced by bars $f\,f$, the upper ends of which are fitted loosely on the rod $b$, and said bars F F, near their lower ends, are connected by a cross-bar, $g$, to which a lever, G, is connected by a rod or link, $h$, the fulcrum $i$ of said lever being on the rear part of the frame D. To the lower ends of the bars F, shares H are attached, one to each. These shares are made of such a form as to render them capable of scraping the earth from the plants at both sides thereof, the space between the inner sides of the shares being sufficiently wide to admit of the latter being drawn along, one at each side of the row of plants, without coming in contact with the latter. These shares may be adjusted at a greater or less distance apart by having cross-bars $g$ of greater or less length, and the depth of the penetration of the shares H into the earth may be regulated by chains $j$, the lower ends of which are attached to the bars F, and the upper ends to the front part of the frame D, said chains being lengthened or shortened, taken up or let out, as may be required. The shares may be raised up out of the ground at any time by depressing the rear end of the lever G, which is within convenient reach of the driver on seat H*. On the axle A there is permanently keyed a bevel-wheel, I, which gears into a bevel pinion, J, on a shaft, K, placed longitudinally in the rear part of the frame C, said shaft K projecting beyond the rear end of the frame, and having a cutting wheel, L, attached to it, which is constructed as follows: A hub, $k$, is keyed on the rear end of the shaft K, into which arms $l$ are fitted radially. These arms are made in the form of sockets to receive the inner ends of bars $m$, the outer parts of which are of curved form, nearly a semicircle, and have cutters M attached to them, (see figs. 1, 2, and 4.) These cutters M may be adjusted further in or out by moving the bars $m$ in the sockets, the bars being secured in position by set-screws $n$, as will be fully understood by referring to fig. 4. As the machine is drawn along the shares H scrape the earth from each side of the row of plants, while the cutters M of the wheel L cut or thin out the plants, a rotary motion being given said wheel by means of the gearing I J from the axle A. The plants may be thinned out at a greater or less distance apart by using more or less cutters M, the latter being readily applied to and detached from the bars $m$, and a cutter applied to every bar, every alternate one, or to every third or fourth one, as may be desired. The driver may, at any time, raise the cutting or thinning-out wheel entirely out of the ground by throwing his weight forward on the frame C.

Having thus described our invention, what we claim as new, and desire to secure by Letters Patent, is—

The scrapers or shares H, arranged or applied to the front part of the machine, so as to be capable of being adjusted higher or lower to penetrate a greater or less depth into the soil, and also capable of being raised entirely out therefrom, substantially as set forth.

JOHN ROBT. WALLACE,
BENJAMIN ARTHUR McCLAIN.

Witnesses:
THEO. SMITH,
J. T. McKINLEY.